Jan. 17, 1961 W. J. SPIERER 2,968,114
COMBINED SINKER AND FISH LURE
Filed Oct. 21, 1958
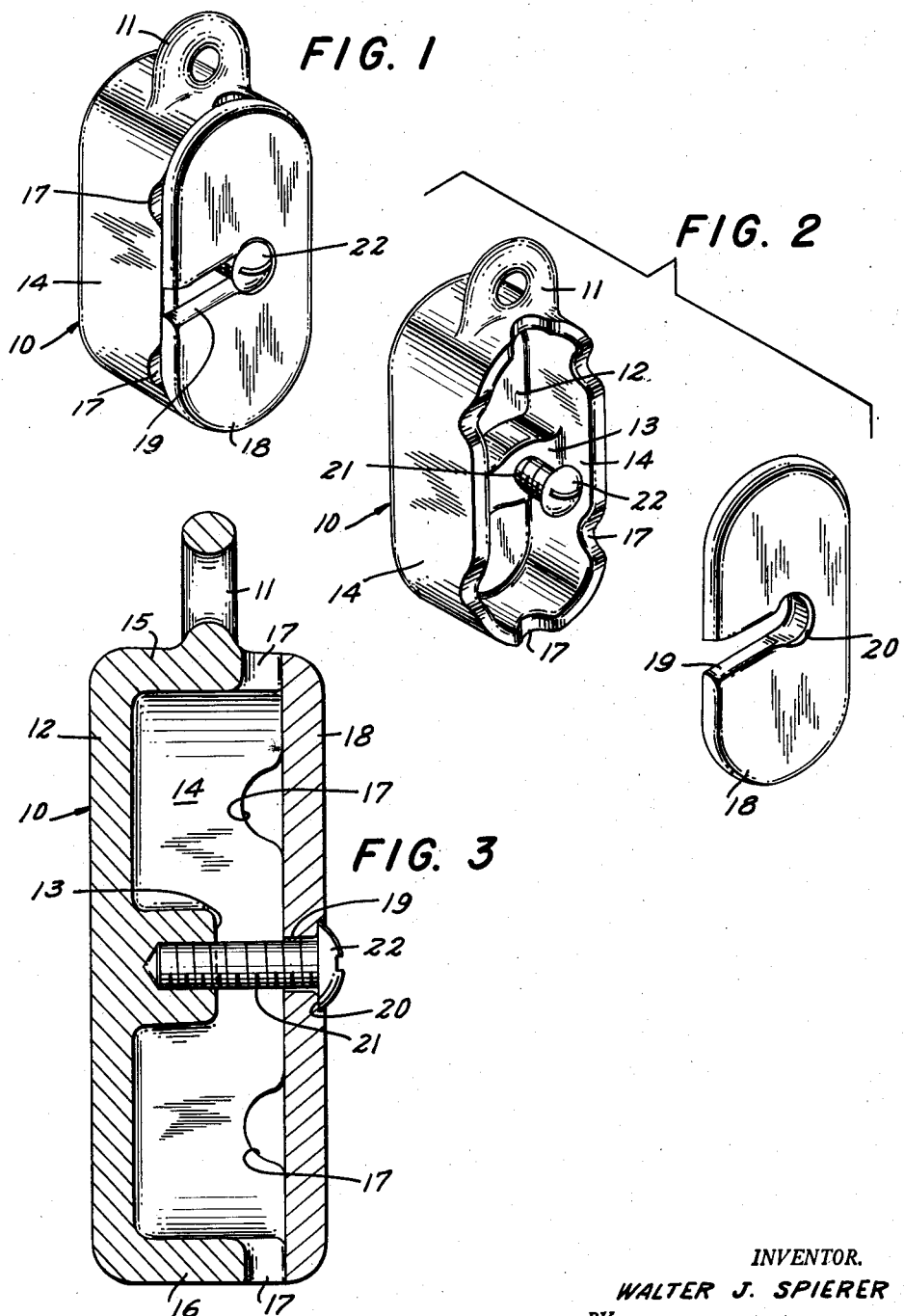
INVENTOR.
WALTER J. SPIERER
BY
ATTORNEY though Fig. 1.

United States Patent Office 2,968,114
Patented Jan. 17, 1961

2,968,114

COMBINED SINKER AND FISH LURE

Walter J. Spierer, 1635 Montgomery Ave., Bronx 53, N.Y.

Filed Oct. 21, 1958, Ser. No. 768,710

2 Claims. (Cl. 43—44.99)

This invention generally relates to fish lures and particularly to a lure in the form of a hollow, perforated container into which "chum" may be placed.

As is well known, fish have the faculty of scenting edible matter and become attracted by such scent. Upon these premises the present invention is based, and contemplates an arrangement of a hollow openable and closeable container adapted to be stocked with edible matter, such as chum, and which container is provided with through passages facilitating the entrance of water into the container and its exit therefrom, after having been scented by the lure inserted in the container.

More specifically, the present invention pertains to a hollow container for instance in the form of a sinker, the body of which is hollow and possesses circumferential walls which are either perforated or recessed, the open end of the hollow sinker body being closed by a cover which is removably secured to the sinker body, so as to facilitate "stocking" the hollow sinker interior with chum and preventing the latter from prematurely escaping.

One of the objects of the present invention therefore is the provision of a fish lure in the form of a sinker, which is inexpensive in its construction and effective in its use, and wherein the sinker is in the form of a hollow body having peripheral walls provided with either recesses or apertures, and wherein the open end of the sinker body is covered by a plate which is removably attached by means of an adjustable keeper, operatively held within the sinker body.

The foregoing object and additional advantages of the present invention will become more fully apparent from the ensuing description, in conjunction with the accompanying drawing, wherein:

Fig. 1 is a perspective view of a presently preferred hollow sinker structure with a removable covering plate closing the open end thereof;

Fig. 2 is an articulated perspective view showing the hollow sinker body and the cover in spaced relation thereto; and Fig. 3 is a longitudinal enlarged cross section through the sinker structure of the present invention, taken approximately along the vertical longitudinal center plane through Fig. 1.

In the drawing the hollow, internally spacious sinker body is denoted at 10. At one outer end of the sinker body is provided an eye structure 11 for suspending the sinker from a line. As will be seen in Figs. 2 and 3, the sinker body constitutes a hollow structure having a solid bottom 12, from which latter extends a boss 13 which bridges the central portions of side walls 14. End walls 15 and 16, see Fig. 3, complete the circumferential wall enclosure of the device. In both side walls 14 and end walls 15 and 16 are provided recesses 17, but instead of such recesses there may be provided apertures passing through the walls, not shown. Both recesses or such apertures are intended to provide access to the interior of the hollow sinker body.

The open end of the sinker body is intended to be closed by means of a cover 18 which is provided with a slot 19 extending at right angles to the longitudinal center axis of the cover. Slot 19 is open at one end at one edge of the cover and extends to substantially the middle of the cover. The interior end of the slot is preferably provided with a top recess 20.

Extending from boss 13 of the hollow sinker body is a screw or bolt 21 provided with an enlargement or head 22 at its outer end, which head is adapted to engage flat recess 20 at the interior end of slot 19. While slot 19 straddles loosened screw 21, cover 18 is slipped over the open end of the hollow sinker body until the interior end of slot 19 engages the screw. The latter is then tightened for holding the cover in place. In that position cover 18 engages the outer edges of walls 14, 15 and 16 and substantially closes the open end of the hollow sinker body 10.

Operation

In the practical application of the device, cover 18 is first removed and a desired quantity of chum is placed into the interior of the hollow sinker body. Now the cover is attached to the open end of the body, thus closing the latter, and the sinker is lowered into the water. As water passes into the sinker through recesses 17 and through the open part of slot 19 of the cover, it is forced to flow past the chum. By the movement of the water through the device the water is scented by the chum and lures fish to the place where the sinker is located.

While the foregoing describes the lure holding device to be in the form of a hollow sinker, its shape, arrangement and identity may have to be changed to meet various requirements, such changes being deemed to reside within the scope of the present invention, as defined in the annexed claims.

What is claimed as new is:

1. In a combination sinker and fish lure, a substantially oval-shaped, box-like hollow body having a solid bottom from which extends a peripheral wall structure formed by two substantially parallel side wall elements and two curved end wall elements joining the side wall elements, there being a plurality of recesses provided along the edges of all wall elements, a central extension projecting from the bottom and bridging the side wall elements at their central portions nearest the bottom, a cover for the hollow body, its peripheral edges conforming in shape substantially to that of the side and end wall elements, there being a centrally located slot extending from one side edge of the cover toward and terminating at substantially the middle of the cover, there being a recess provided at the slot terminus, and a threaded element extending from the center of said central bottom extension and having a head removably engaging the recess at the slot terminus.

2. In a combination as in claim 1, and wherein an eye structure is formed at and extends from one of the curved end wall elements of the hollow body.

References Cited in the file of this patent

UNITED STATES PATENTS

| 2,440,012 | Haver | Apr. 20, 1948 |
| 2,763,957 | Roberts | Sept. 25, 1956 |
| 2,774,174 | Ganger | Dec. 18, 1956 |
| 2,842,889 | Ganger | July 15, 1958 |

FOREIGN PATENTS

| 462,527 | France | Nov. 24, 1913 |
| 817,164 | Germany | Oct. 15, 1951 |